United States Patent

[11] 3,542,071

[72] Inventors Gene E. Lightner
Kennett Square, Pennsylvania;
Frederick J. Debbrecht; Howard Blair Muhlestein, Wilmington, and Robert W. S. Seeds, North Star, Newark, Delaware
[21] Appl. No. 728,259
[22] Filed May 10, 1968
[45] Patented Nov. 24, 1970
[73] Assignee Hewlett-Packard Company
Palo Alto, California
a corporation of California

[54] FLUID FLOW CONTROL VALVE
16 Claims, 5 Drawing Figs.
[52] U.S. Cl. ................................................... 137/625.46
[51] Int. Cl. ........................................................ F16k 11/08
[50] Field of Search ........................................... 137/625.46, 625.29, 625.41, 625.15, 625.21

[56] References Cited
UNITED STATES PATENTS
3,203,249 8/1965 Jentzsch et al. .................. 137/625.21

| | | | |
|---|---|---|---|
| 2,827,924 | 3/1958 | Towler et al. ................. | 137/625.15X |
| 3,115,150 | 12/1963 | Sariotti et al. ................ | 137/625.46X |
| 3,270,751 | 9/1966 | Tucker ........................ | 137/625.41X |

*Primary Examiner*—M. Cary Nelson
*Assistant Examiner*—Michael O. Sturm
*Attorney*—Mortenson and Weigel

ABSTRACT: A rotary valve has a fixed body and a rotatable disc held in compressive sliding contact with the valve body. Flow passages through the valve body terminate at ports in the contacting face of the valve body. Shallow grooves are formed in the contacting face of the disc to disconnect and to interconnect selected ones of the ports. The distance separating the shallow grooves from each other or the valve exterior should be no greater than the minimum distance separating any of the ports in the valve body. Portions are cutaway from the disc face such that the centroid of the disc face corresponds as closely as possible to the center of rotation of the disc. This reduces the possibility of unequal pressures interfering with the valve's sealing ability. A shallow recess or dimple is formed in the disc's face at all locations which, at rest, abut a port or groove in the face of the valve body.

Patented Nov. 24, 1970

3,542,071

INVENTORS
GENE E. LIGHTNER
FREDERICK J. DEBBRECHT
H B. MUHLESTEIN
ROBERT W. S. SEEDS
BY
Mortenson and Weigel
ATTORNEYS

FLUID FLOW CONTROL VALVE

This invention relates to fluid flow control means and, more particularly, to a relatively leak free valve having relatively low turning torque and capable of controlling the flow of relatively small quantities of fluid.

BACKGROUND OF THE INVENTION

In fluid, including both liquids and gases, handling operations it is often necessary to direct the flow of various fluids through different lines or conduits. Over the years various valves and valving systems have been designed to meet this need. These prior art valves and valving systems have been quite satisfactory for large volume applications but often unsatisfactory for switching relatively small quantities or microvolumes as is required in the field of gas chromatography, for example. Valves capable of switching microvolumes of fluids should have a relatively low volume, as few as possible dead spaces within the valve, and be capable of leak free operation during usage and over extended periods of time.

One known valve which meets some of these requirements is described in U.S. Pat. No. 2,757,541 issued Aug. 7, 1956 to Watson et al. Watson et al. describe a rotary type valve in which one polished surface, the rotor, is rotated with respect to the polished surface of the valve body. The rotation of the valve rotor interconnects various ports in the valve body. The rotor surface has channels formed therein to make the necessary port interconnections. This rotor surface usually is formed of a semiresilient plastic. One particularly undesirable quality of many suitable plastics, which creates a significant problem in these valves, is the "creep" or "cold flow" which the plastic material undergoes when subjected to pressure over a period of time. This "cold flow" results in a portion of the plastic material to creep into the ports or recesses of the valve body, thereby forming small dimples or ridges in the rotor's surface. When the valve is again rotated, this dimple or ridge causes the sealing faces to separate and a leak occurs. Such leaks are intolerable.

Another problem with the valves of the prior art results from unequal forces being applied to the grooves in the rotor which tends to unseat the valve faces and cause leakage.

It is, therefore, an object of this invention to provide an improved fluid flow control device free of many of the difficulties encountered by those of the prior art.

Another object of this invention is to provide an improved valve capable of handling microvolumes of fluids under relatively high pressures.

BRIEF DESCRIPTION OF THE INVENTION

The fluid flow control device of this invention includes a fixed member having a planar face and a plurality of fluid passages therein each terminating in a port in the planar face. The planar face of a movable member of semiresilient material is held compressively in sliding contact with the face of the fixed member. A plurality of shallow channels are formed in the face of the movable member and positioned to selectively couple and decouple different ones of the ports depending on the relative position of the two members. A shallow recess is formed in the movable member's face adjacent the rest position of any of the fixed member's ports or recesses. This aids in preventing the formation of dimples or other protrusions in the face of the movable member due to cold flow of the semiresilient material and thereby aids in maintaining the seal between the faces.

In one embodiment of the invention, a shallow channel is formed in the faces of both the fixed member and the movable member and is positioned to cooperate with a second channel in the movable member's face to couple and decouple simultaneously different pairs of the ports at two separate points. This enables the valve to have a longer life since two separate points must fail before leakage occurs.

In still another embodiment of the invention, portions of the movable member's face are undercut or cutaway such that the lineal distance between any of the shallow channels or between any of the channels and the valve exterior may be reduced to not exceed the minimum distance between any of said ports. This reduction of surface area of the sealing faces reduces the torque required to turn the disc member and increases the contact pressure between the faces. Portions of the disc face are cutaway such that the centroid of the movable member's face approaches its center of rotation. This aids in insuring that the pressure between the faces is substantially uniform. These cutaway portions are vented to avoid unsealing due to pressure buildup.

DESCRIPTION OF THE DRAWINGS

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

DESCRIPTION OF THE PREFERRED EMBODIMENT

Figures 1, 2, 3, 4, 5:
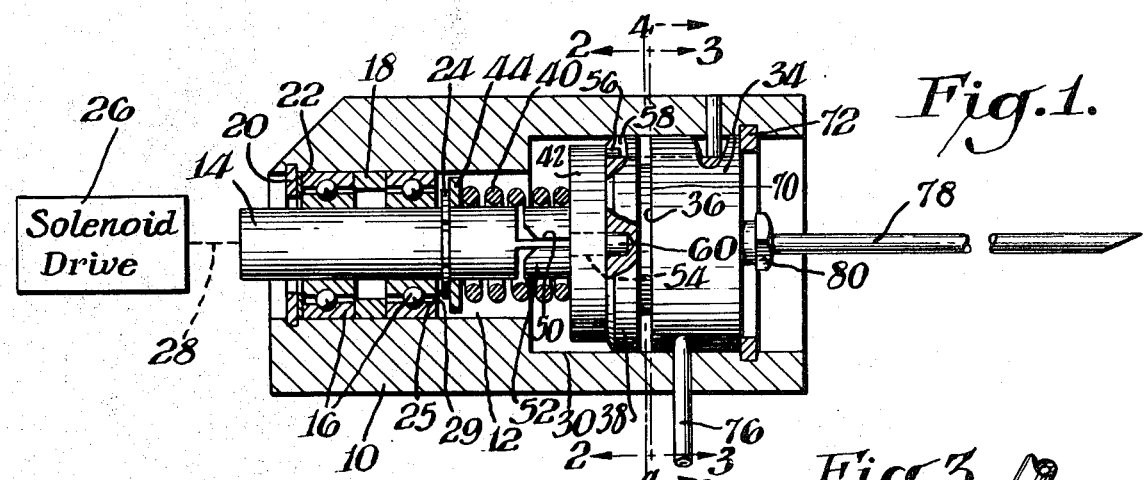
FIG. 1 is a cross-sectional view of a valve constructed in accordance with this invention.
FIG. 2 is a sectional view of the valve taken along the section line 2–2 of FIG. 1.
FIG. 3 is a sectional view of a valve illustrated in FIG. 1 taken along the section line 3–3.
FIG. 4 is a sectional view of the valve illustrated in FIG. 1 taken along the section line 4–4.
FIG. 5 is a cross-sectional view of the valve body and rotating member taken along the section lines 5–5 of FIGS. 2 and 3.

The valve or fluid flow control device of this invention is illustrated in FIG. 1 as a simple three-way valve which is capable of blocking or connecting an input conduit to either of two output conduits. Such device includes a generally cylindrical housing 10 which may be of stainless steel or other suitable rigid material. The housing 10 has a bore 12 along the axis of the housing which accommodates a drive shaft 14 journaled within the bore 12 by a pair of bearings 16 spaced apart by a ring spacer 18. The bearings 16 are retained in position in the bore 12 by an internal retaining ring 20 and a spacer washer 22 on the one hand and an external retaining ring 24 and spacer washer 25 on the other hand. The retaining ring is positioned in a groove in the drive shaft 14 at a longitudinal point which abuts the inner side of the bearings 16. These two retaining rings 20 and 24 restrain the bearings 16 from longitudinal movement. The drive shaft 14 is adapted to be driven by a suitable solenoid drive, denoted by the box 26, acting through a suitable mechanical linkage 28. While any commercial solenoid drive may be used for this purpose, one that has been used successfully is that described in copending U.S. Pat. application entitled "Automatic Dispensing System" Ser. No. 728,258, filed May 10, 1968, now U.S. Pat. No. 3,491,368 by Debbrecht et al. The Debbrecht et al. solenoid drive envisions two oppositely acting solenoids driving a common plunger in opposite directions. Normally the plunger is retained at center or neutral position by a restoring spring. The plunger motion actuates a crank arm to position the shaft 14 at any of three angular positions under command of electrical actuating signals. In the alternative, a simple knob, with appropriate detents or stops mounted to the housing 10, could be employed for manual operation. A servomotor or other prime mover also could be used to position the drive shaft 14.

The other end of the housing 10 is counterbored as at 30 to accommodate the switching portion of the valve in the cavity thus formed. The switching portion of the valve includes a fixed stator member or valve body 34 held compressively in contact with a disclike rotor member 38. This ported valve body 34 has a plurality of channels or passages drilled or formed therein to permit the passage of a fluid, including either liquids or gases, all of which terminate on one planar face 36 of the valve body. The rotor disc 38 also has a planar face 70 which is compressively held in sliding contact with the face 70 of the valve body 34 by means of a compression spring 40 and a pressure plate 42 which supports the valve rotor disc 38.

The compression spring 40 slides over the inner end of the shaft 14 and abuts a spring retaining washer 44 on the one hand and the pressure plate 42 on the other. The end of the drive shaft 14 includes a planar projection in the nature of a screwdriverlike male member which is inserted into a coaxially disposed slot 50 in the pressure plate 42. The backside (left side in the drawing) of the pressure plate 42 includes the protrusion 52 in which the slot 50 is formed. The protrusion 52 is roughly of the same diameter as the drive shaft 14 and is coaxially alined therewith. The pressure plate 42 may be formed of any suitable material such as stainless steel and is in the general shape of a disc with a pin 54 affixed therein at the center of its rotation. This pin 54 is press fitted into the center of the rotor disc 38. A second pin 56, positioned in the peripheral portion of the pressure plate 42, is adapted to engage a slot 58 in the peripheral portion of the rotor disc 38. This particular drive for the rotor disc 38, including the second pin 56 and the center pin 60 transmits the rotational drive imparted by the drive shaft 14 to the rotor disc 38 on an axis substantially perpendicular to the face 36 of the valve body 34. In other words, no unseating torque is applied to the rotor disc.

The rotor disc 38 may be formed of any suitable material. One that is preferred is a semiresilient material which is chemically inert and preferably one which is self-lubricating. Suitable materials for this purpose are the tetrafluoroethylene resins sold commercially as "Teflon" or a graphite impregnated tetrafluoroethylene resin sold under the trade name "Rulon 123". The face of the rotor disc 38 which is in contact with the face 36 of the valve body 34 is lapped and burnished to provide a flat planar face 70 which preferably is flat at the desired operating pressure to within one band of light. As will be described hereinafter, the face 70 of the rotor disc 38 has one or more shallow channels or grooves formed therein which depending upon the rotational position of the shaft 14, interconnect or disconnect pairs of the ports formed in the face 36 of the valve body 34. The valve body 34 is retained within the counterbore 30 by an internal retaining ring 72.

The conduits 94 and 96 (FIG. 5) within the valve body 38 may be formed as by drilling and either may be axially disposed through the entire body as is the conduit 94 or drilled initially axially from the face 36 into the valve body and then radially to interconnect therewith as is conduit 96. In the illustration of FIG. 3, tubes 76 and 100, preferably of stainless steel, are shown as inserted into respective ones of the radially positioned conduits 96 and 98 within the valve body 34. The tubes 76 may be secured as by soldering. A syringe needle 78 is shown as being axially connected to the central conduit 94 of the valve body 34. The needle 78 either may be soldered to the valve body 34 or, as in this instance, mounted by a locknut 80 which is screwed in the tapped valve body 34.

The shallow grooves which are formed in the face 70 of the rotor disc 38 and the face 36 of the valve body 34 are best seen in FIGS. 2 and 3. The valve body 34 for the three-way valve illustrated has only three ports 90, 92, and 94, respectively. The center port 94 is drilled axially through the valve body 34 so that its conduit 95 communicates with the needle 78. In similar manner, the peripheral port 90 has its conduit 96 drilled first axially and then radially shown by the dotted lines in FIG. 3 to communicate with the tube 76. The final peripheral port 92 has its conduit 98 drilled both axially and radially until it communicates with a similar tube 100. While only three ports are shown, it is to be understood that the valve body 34 may have any number of ports ranging typically from a minimum of one (although one port would have limited use) up to a maximum number limited only by the surface area of the face 36 of the valve body 34.

The illustration of FIG. 2 views the face 70 of the rotor disc 38 such that the shallow grooves 102, 108 and 110 formed in the rotor disc face 70 are clearly visible. These grooves are illustrated as positioned to interconnect or couple either of the peripheral ports 90 and 92 of FIG. 3 to the center port 94. This is achieved by forming a single radial groove 102 which extends, from the center of rotation 104 (FIG. 2) of the rotor disc 38, outwardly to encompass the radius of the ports 90 and 92. The radial groove 102 typically has a width which at least equals or preferably slightly exceeds the diameter of the ports 90, 92, and 94. The depth of the groove need not be great and preferably is such as to provide a total groove volume comparable to the volume per unit length of the tubes 76 and 100. This reduces dead spaces within the valve systems as is highly desired particularly in gas chromatography applications.

Arcuate shallow grooves 108 and 110, respectively, (FIG. 2) are formed at the same radius with respect to the center of rotation 104 as the ports 90 and 92 (FIG. 3) are with respect to the center port 94. The arcuate shallow grooves 108 and 110 extend through a sufficient angle such that rotation of the rotor disc 38 permits them to include the respective ports 90 and 92. To provide a fail-safe operation, in accordance with this invention, corresponding arcuate grooves 112 and 114, respectively, are formed in the face 36 of the valve body 34 at the same radius as and substantially coincident with the grooves 108 and 110, i.e., grooves 112 and 114 cover the same angle as the grooves 108 and 110, respectively. In this manner when the faces 70 and 36 are together, the path of fluid flow from the central port 94 is blocked by the gap between the radial groove 102 and the corresponding mating pairs of peripheral grooves 108—114 and 110—112 on the one hand, and the gap between the ports 90 and 92 and the cooperating grooves 108—114 and 110—112 on the other hand. Thus if the seal provided by either but not both gaps is broken, the flow path remains blocked and the valve does not fail. This double gap safeguard may be omitted if desired and the radial groove 102 rotated 180° (in the drawing) such that simple rotation of the groove to either side will connect the center port 94 to either of the peripheral ports 90 and 92.

In the embodiment illustrated, when the valve is rotated 22½° in a clockwise sense, to that position illustrated in the sectional view of FIG. 4, the center port 94 is connected to the left-hand peripheral port 90. With this 22½° rotation, the radial groove 102, cooperating with the peripheral disc groove 110 and the valve body peripheral groove 112 provides a channel from the center port 94 to the exterior port 90 through the radial groove 102, valve body peripheral groove 112 and the rotor disc peripheral groove 110 to the port 90. Flow to the remaining port 92 remains blocked by the seal between the faces 70 and 36. Rotation of the rotor disc 38 in the counterclockwise direction provides a similar channel of communication between the center port 94 and the peripheral port 92. In the neutral position, flow is blocked by the double gap described.

In accordance with another aspect of this invention, the problems encountered by the "cold flow" or "creep" of the "Teflon" plastic are overcome. Normally when the valve is in its neutral position, with the rotor disc face 70 facing the valve body face 36, a portion of the semiresilient "Teflon" material creeps into the cavities of the peripheral ports 90 and 92 causing a small protrusion or bump. When the valve is rotated, the seal between the faces is broken —the protrusion forces the faces apart. This problem is obviated in accordance with this invention by forming, as seen in FIGS. 2 and 5, shallow recesses 120 and 122 at respective angular positions corresponding to the normal rest positions of the ports 90 and 92. These shallow recesses are formed only to a depth slightly in excess of that corresponding to the ability of the material to "creep". Thus, "Teflon" under a typical pressure of 100 pounds per square inch (p.s.i.) has the ability to "creep" some 3 to 4 mils. Accordingly, these shallow recesses 120 and 122 are formed to have a depth in the order of 5 mils. This has been found to be adequate to avoid this leakage problem due to the creeping or cold flow of the materials employed. The recesses 120 and 122 have a diameter at the surface of face 70 which equals or preferably slightly exceeds that of the ports 90, 92. Any and all concave, grooved or ported regions of the fixed face 36 require the corresponding neutral or rest positions of the semiresilient disc rotor 30 to be similarly treated. If a material not subject to creeping is employed, the recesses are unnecessary.

In accordance with another aspect of this invention, the uniformity of the seal or the applied pressure to all areas of the faces 70 and 36 is maintained more uniform. This uniformity is obtained along with increased sealing pressure and lower torque required for the drive shaft 34 by cutting away a portion of the face 70 of the rotor disc 38 as seen in FIG. 2 so that only a relatively small portion of the face remains. The portion remaining is determined by the minimum spacing between any of the ports 90, 92, and 94 and their adjacent grooves. Thus, for example, in FIG. 3 it is seen that the minimum spacing appears to be between one of the grooves 112 and 114 and one of the ports 90 and 92. This spacing determines how far the material may be cut away. This spacing is preferably maintained between the groove 110 in FIG. 2 and the outer periphery 111 of the face 70. In like manner, a portion 130 is cut away at the center of the face 70 in the rotor disc 38 and an axial hold or vent 132 formed through the disc 38 to permit access to the atmosphere. The vent is preferred to prevent pressure buildup in the recessed portion 130 and decreased sealing pressure. The particular configuration of the recessed portion 130 is such that the face 70 has a total area whose centroid substantially corresponds to or coincides with the center of rotation 104 of the disc 38. With this configuration, sealing pressure over the face 70 which could create an unsealing torque is maintained relatively uniform. There is little unsealing effect which would have a deleterious effect on the seal between the faces 70 and 36. As the radius increases, smaller forces are required to unseat the valve faces and break the seal. The particular shape of the recessed portion 130 will vary with the other desired grooves and recesses which are formed in the face 70 to permit the valve to perform its desired function.

In alternative embodiments of the invention, the fail-safe principle may be extended to provide two, three or more gaps in the cooperating recesses 110—112 and 108—114. For example, the mating grooves 110—112 (and 108—114) may be broken to provide a sealing gap at the halfway point of the arc. This places three gap or cutoff points in the fluid flow path which are simultaneously completed or broken. More or less gaps may be included as desired. The mating arcuate grooves may be used to interconnect a pair of ports disposed at the same radius in the valve body. The radially disposed groove 102 need not be used.

The principles of this invention are applicable to linear motion as well as rotary valves, although the rotary valves are preferred.

There has thus been described a novel valve in which a relatively high pressure seal is maintained between the valve faces and yet the valve requires a low shaft turning torque. The seal is maintained relatively uniform over the surface of the faces by removing portions of the face of the disc such that its centroid coincides with its center of rotation. A vent to the removed areas of the disc face prevents built up pressure from reducing the sealing pressure. The effects of cold flow of the semiresilient disc material are overcome by the incorporation of shallow recesses in these areas exposed to cold flow conditions. A more fail-safe valve is obtained by the use of mating, coincident grooves in each sealing face of the valve. When a pair of these grooves are relatively moved along a given path, spaced ports lying on the path and encompassing the grooves are interconnected.

We claim:

1. A fluid flow control device comprising:
 a body member having a planar face, at least two ports in said face, and a corresponding number of fluid passages therein each having one end communicating with a different one of said ports;
 a second member having a planar face of semiresilient material subject to deformation under pressure compressively positioned in slidable contact with said body member face;
 a first shallow channel in said second member's face positioned to selectively couple and decouple said two ports depending on the relative sliding positions of said members;
 said second member having a neutral position relative to said body member wherein at least one of said ports is decoupled from all other ports; and
 a shallow recess in said second member face at a location abutting the position of each one of said ports when decoupled from the other ports in said neutral position, thereby to maintain a seal between said faces during operation despite deformation of said face of said second member.

2. A device according to claim 1 wherein said second member face is cut away such that the lineal distance between any of said channel, said recess, and the edge of said second member face is not less than the minimum distance between said channel and said recess, thereby to reduce the torque required to turn said second member and increase the contact pressure between said faces.

3. A device according to claim 1 wherein said second member is in the form of a disc:
 said disc and body member adapted to be relatively rotated while their faces are in sliding contact; and
 said disc face being cut away such that the centroid of the disc face approximates the center of rotation, whereby the pressure moment over the area of said faces is substantially uniform.

4. A device according to claim 3 wherein said disc face is cut away such that the lineal distance between any of said channel, said recess, and the edge of said disc face is not less than the minimum distance between said channel and said recess, thereby to reduce the torque required to turn said disc member and increase the contact pressure between said faces.

5. A device according to claim 1 which also includes a second shallow channel in said body member face and a mating shallow channel in said second member face positioned to couple said ports together through said first channel, said second channel and said mating channel, thereby to permit the decoupling of said ports at two separate points.

6. A device according to claim 5 wherein the face of said second member is cut away such that the lineal distance between any of said channel, said recess, and the edge of said second member face is not less than the minimum distance between said channel and said recess, thereby to reduce the torque required to turn said second member and increase the contact pressure between said faces.

7. A device according to claim 5 wherein said second member is in the form of a disc:
 said disc and body member adapted to be relatively rotated while their faces are in sliding contact; and
 said disc face being cut away such that the centroid of the disc face approximates the center of rotation, whereby the pressure moment over the area of said faces is substantially uniform.

8. A device according to claim 7 wherein said disc face is cut away such that the lineal distance between any of said channel, said recess, and the edge of said disc face is not less than the minimum distance between said channel and said recess, thereby to reduce the torque required to turn said disc member and increase the contact pressure between said faces.

9. A device according to claim 8 wherein said first channel is radially disposed on said disc face.

10. A device according to claim 9 where said cut away portion is vented.

11. A fluid flow control device comprising:

a fixed member having a planar face, a plurality of ports in said face, and a corresponding number of fluid passages therein each having one end communicating with a different one of said ports;

a movable member having a planar face of semiresilient material compressively positioned in slidable contact with said fixed member face; and a plurality of shallow channels in said movable member face positioned to selectively couple and decouple different ones of said ports depending on the relative rotational positions of said members, a portion of the face of said movable member being cut away such that the centroid of said movable member face approximates the center of rotation of said movable member.

12. A device according to claim 11 which also includes a plurality of channels in said fixed member face each positioned to cooperate with corresponding pairs of said channels in said movable member face to decouple and couple different pairs of said ports at two separate points.

13. A device according to claim 12 which also includes means defining a vent to any of said cut away portions which are enclosed.

14. A fluid flow control device comprising:

a fixed member having a planar face, a plurality of ports in said face, and a corresponding number of fluid passages therein each having one end communicating with a different one of said ports;

a movable member having a planar face of semiresilient material compressively positioned in slidable contact with said fixed member face;

a plurality of shallow channels in said movable member face positioned to selectively communicate with different ones of said ports depending on the relative positions of said members; and a plurality of shallow channels in said fixed member face each positioned to cooperate with corresponding ones of said channels in said movable member face to decouple and couple different pairs of said ports at at least two separate points.

15. A device according to claim 14 wherein said movable member face is rotatable relative to said fixed member face, and at least some of said shallow channels in each of said faces are arcuate and of the same radius.

16. A device according to claim 15 wherein said movable member face is cut away such that its centroid approximates the center of rotation of said movable member.